United States Patent
Schulz et al.

(10) Patent No.: US 11,796,118 B2
(45) Date of Patent: Oct. 24, 2023

(54) FLEXIBLE VACUUM-INSULATED LINE

(71) Applicant: NEXANS, Courbevoie (FR)

(72) Inventors: Holger Schulz, Hannover (DE); Jurgen Essler, Rehburg-Loccum (DE)

(73) Assignee: NEXANS, Courbevoie (FR)

( * ) Notice: Subject to any disclaimer, the term of this patent is extended or adjusted under 35 U.S.C. 154(b) by 33 days.

(21) Appl. No.: 16/713,369

(22) Filed: Dec. 13, 2019

(65) Prior Publication Data

US 2020/0224816 A1 Jul. 16, 2020

(30) Foreign Application Priority Data

Dec. 19, 2018 (EP) .................................... 18306734

(51) Int. Cl.
| | |
|---|---|
| *F16L 11/00* | (2006.01) |
| *F16L 59/065* | (2006.01) |
| *F16L 11/15* | (2006.01) |
| *F16L 11/16* | (2006.01) |
| *F16L 11/20* | (2006.01) |

(52) U.S. Cl.
CPC ............. *F16L 59/065* (2013.01); *F16L 11/15* (2013.01); *F16L 11/16* (2013.01); *F16L 11/20* (2013.01)

(58) Field of Classification Search
CPC .......... F16L 59/065; F16L 11/15; F16L 11/16; F16L 11/20
USPC ....... 138/121, 122, 148, 114, 129, 131, 134, 138/135
See application file for complete search history.

(56) References Cited

U.S. PATENT DOCUMENTS

| | | | | |
|---|---|---|---|---|
| 1,699,911 | A * | 1/1929 | Palmer .................... | F16L 33/26 285/114 |
| 2,056,840 | A * | 10/1936 | Collom ............... | F01N 13/1816 138/113 |
| 2,256,386 | A * | 9/1941 | Farrar ..................... | F16L 11/16 138/131 |
| 3,204,666 | A * | 9/1965 | Lindsay ................. | F16L 59/153 138/135 |
| 3,240,234 | A * | 3/1966 | Bond, Jr. ............... | F16L 11/118 138/129 |
| 3,490,496 | A * | 1/1970 | Stearns .................. | F16L 59/125 138/112 |
| 3,831,636 | A * | 8/1974 | Bittner ............... | H01B 11/1869 174/105 R |
| 3,934,618 | A * | 1/1976 | Henderson ................. | F16L 9/18 138/114 |

(Continued)

FOREIGN PATENT DOCUMENTS

WO 2013/120459 8/2013

OTHER PUBLICATIONS

International Search Report dated May 28, 2019.

*Primary Examiner* — James F Hook
(74) *Attorney, Agent, or Firm* — Sofer & Haroun, LLP

(57) ABSTRACT

A vacuum-insulated line (200) has an inner and an outer corrugated hose (101, 102) which are separated from one another by an evacuated intermediate space (103). One of the corrugated hoses is encased with a wound hose (201). The wound hose (201) prevents the line (200) from becoming elongated when it is charged with pressure during the transport of a medium. The wound hose (201) furthermore protects the line against external mechanical loads or damage. The wound hose simultaneously protects the corrugated hoses against excessive bending.

6 Claims, 2 Drawing Sheets

(56) References Cited

U.S. PATENT DOCUMENTS

| | | | | |
|---|---|---|---|---|
| 4,036,618 A * | 7/1977 | Leonard | F16L 9/18 | 62/50.7 |
| 4,344,462 A * | 8/1982 | Aubert | F16L 11/16 | 138/130 |
| 4,800,928 A * | 1/1989 | Kanao | F16L 11/16 | 138/122 |
| 4,984,605 A * | 1/1991 | Schippl | F16L 59/065 | 138/111 |
| 5,884,670 A * | 3/1999 | Akedo | F16L 11/16 | 138/119 |
| 6,065,501 A | 5/2000 | Feret et al. | | |
| 6,116,287 A * | 9/2000 | Gropp | F16L 51/027 | 138/114 |
| 6,354,332 B1 * | 3/2002 | Burkhardt | F16L 11/15 | 138/109 |
| 6,513,552 B1 * | 2/2003 | Shepherd | F16L 11/20 | 138/131 |
| 7,055,551 B2 * | 6/2006 | Fraser | B21C 37/154 | 138/132 |
| 7,681,599 B2 * | 3/2010 | Lange | F16L 59/141 | 138/114 |
| 2001/0035224 A1 * | 11/2001 | Neumann | F16L 59/12 | 138/112 |
| 2005/0011573 A1 * | 1/2005 | Chahine | F16L 11/16 | 138/148 |
| 2008/0190508 A1 * | 8/2008 | Booth | F16L 11/16 | 138/142 |
| 2009/0114303 A1 * | 5/2009 | Kim | F01N 13/1816 | 138/121 |
| 2010/0108169 A1 * | 5/2010 | Frohne | F16L 11/15 | 138/112 |
| 2011/0089679 A1 * | 4/2011 | Meredith | F16L 1/26 | 285/15 |
| 2011/0186169 A1 * | 8/2011 | Pionetti | F16L 39/005 | 138/114 |
| 2012/0241037 A1 * | 9/2012 | Lund | E21B 17/017 | 29/428 |
| 2012/0304447 A1 * | 12/2012 | Smith | E21B 17/017 | 29/434 |
| 2013/0042478 A1 * | 2/2013 | Witz | F16L 11/15 | 29/890.144 |
| 2014/0377010 A1 * | 12/2014 | Van Belkom | F16L 57/02 | 405/168.1 |
| 2015/0276118 A1 | 10/2015 | Espinasse | | |

* cited by examiner

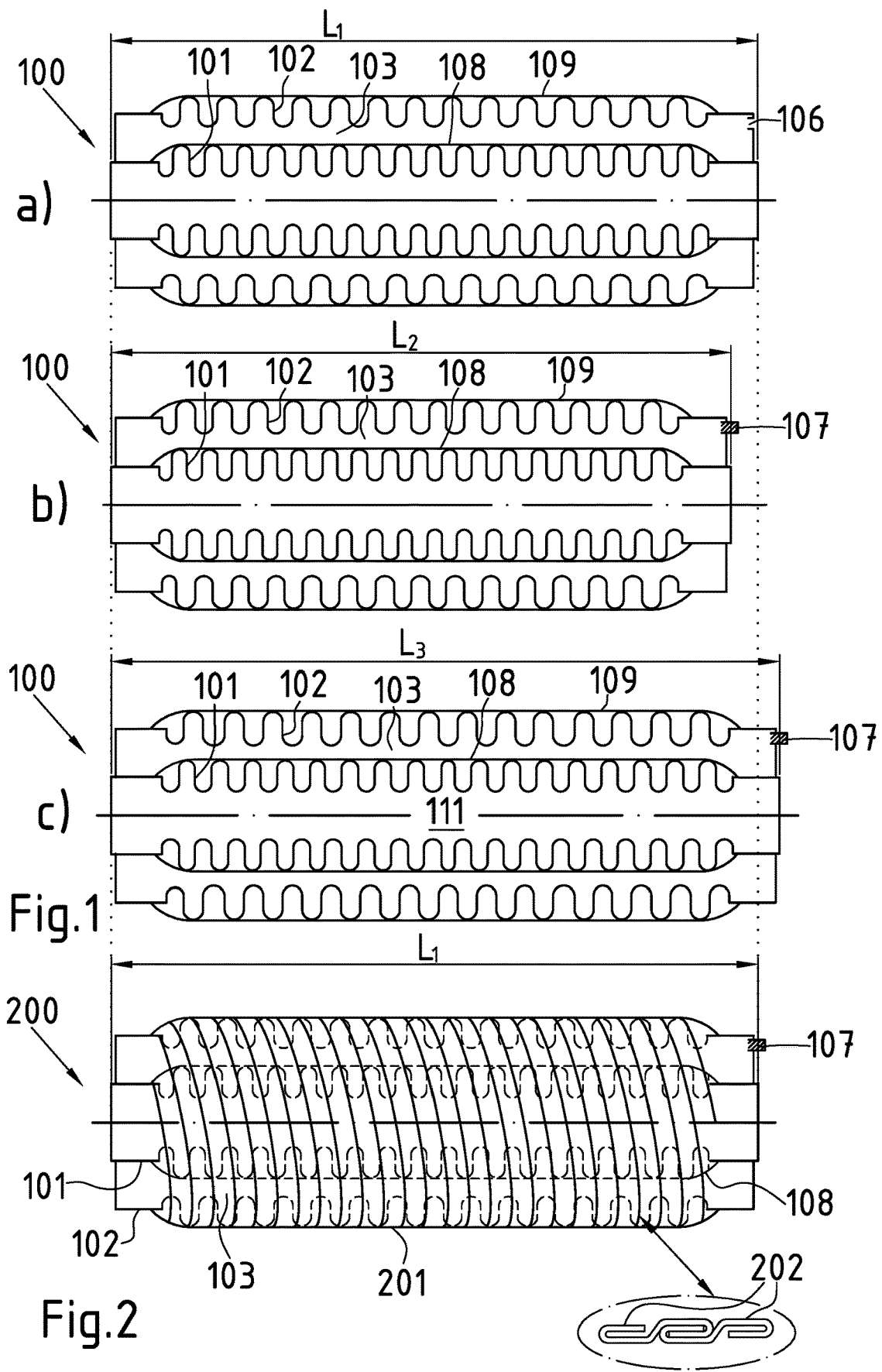

FLEXIBLE VACUUM-INSULATED LINE

RELATED APPLICATION

This application claims the benefit of priority from European Patent Application No. 18 306 734.7, filed at Dec. 19, 2018, the entirety of which is incorporated by reference.

FIELD

The invention relates to a vacuum-insulated line having an inner and outer corrugated hose. The invention also relates to a loading station having a vacuum-insulated line.

BACKGROUND

Vacuum-insulated lines for transporting supercooled (cryogenic) media commonly comprise an inner and an outer corrugated hose composed of metal. The intermediate space between the inner and the outer corrugated hose is evacuated in order to achieve very good thermal insulation in order that, during the transport of a cryogenic medium through the line, the cryogenic medium absorbs as little heat as possible. Additionally, the inner corrugated hose is generally encased with a superinsulator and is held centrally in the outer corrugated hose by means of spacers.

Since the corrugated hoses are flexible in an axial direction, the pressure of the cryogenic medium transported through the inner pipe leads to elongation of the line. Such elongation is basically undesirable because it can lead to an uncontrolled movement of the line, which can lead to damage to the line or to objects that are in contact with the line. To prevent excessive elongation, it is known for the inner and/or the outer corrugated hose to be encased with a mesh. The mesh is tension-resistant and limits the elongation of the line. However, the mesh can absorb only tensile forces but not compressive forces, which has the effect that, during the production of the vacuum-insulated line, the line is initially shortened when the intermediate space between the inner corrugated hose and the outer corrugated hose is evacuated. When a medium is transported through the line under pressure during operation, the vacuum-insulated line stretches again, because the mesh, until it has attained its maximum length, initially does not absorb the tensile forces that arise here.

In the case of vacuum-insulated lines equipped with a mesh, although the length expansion is limited when a medium is transported under pressure through the line, the length expansion is not entirely prevented. Here, it is not of importance whether the mesh is arranged on the inner corrugated hose or on the outer corrugated hose. Even if both the inner and the outer corrugated hose are encased with a mesh, the described characteristics basically remain unchanged.

Proceeding from this, the present invention is based on the object of creating a vacuum-insulated line for overcoming or at least alleviating one or more of the problems mentioned in the introduction.

SUMMARY OF THE INVENTION

To achieve said object, the invention proposes, according to a first aspect, a vacuum-insulated line having an inner and an outer corrugated hose which are separated from one another by an evacuated intermediate space. One of the corrugated hoses is encased with a reinforcement hose which is tension-resistant and/or compression-resistant in an axial direction.

In an advantageous embodiment, the reinforcement hose is designed as a wound hose. In another advantageous embodiment, the reinforcement hose is constructed from interconnected plastics elements which are movable relative to one another. In the same way as the wound hose, the reinforcement hose composed of interconnected plastics elements is tension-resistant and/or compression-resistant in an axial direction. A reinforcement hose composed of plastic is for example advantageous wherever it is necessary to prevent the formation of sparks owing to the presence of an increased explosion hazard.

With the reinforcement hose or wound hose, the mechanical characteristics of the line are improved; for example, the wound hose protects the line against external mechanical loads or even damage. The wound hose simultaneously serves as a means for protecting the corrugated hoses against excessive bending. The same advantages are realized with the reinforcement hose composed of interconnected plastics elements as with a wound hose, wherein the advantages may be attained to slightly different degrees in the case of the two embodiments.

All embodiments have in common the fact that the vacuum-insulated line does not significantly change its length when it is internally charged with pressure during the transport of a medium. With wound hoses in particular, the elongation of the line when the line is charged with pressure can be prevented entirely.

The corrugated hoses are advantageously designed to be corrugated in a circumferential direction and flexible.

The reinforcement hose is expediently also designed to be flexible. The flexibility of the reinforcement hose ensures that the vacuum-insulated line as a whole remains flexible and can be easily routed at the respective location of use.

In one exemplary embodiment, the wound hose is constructed from interconnected metal strips. Such a wound hose is mechanically stable and inexpensive to produce.

It is expediently possible for the inner and the outer corrugated hose to be welded to one another in vacuum-tight fashion at their ends.

In a further exemplary embodiment of the line, either the inner or the outer corrugated hose is encased with the reinforcement hose, whereas the other corrugated hose is encased with a mesh. In this exemplary embodiment, it is the case, in the conventional manner, that the outer corrugated hose is enwound with the reinforcement hose, because good mechanical protection against transverse compressive load-bearing capacity is simultaneously achieved in this way. The reinforcement hose may however basically also be arranged on the inner corrugated hose. Both variants have the common characteristic that they do not significantly change their length when they transport a medium under pressure.

According to a second aspect, the invention proposes a loading device for cryogenic fluids having a line according to the first aspect of the invention. The loading device avoids problems that result from an elongation of the line when the line is charged with pressure for the purposes of transporting the cryogenic fluid.

BRIEF DESCRIPTION OF THE DRAWING

The invention will be discussed in more detail below by way of example on the basis of an embodiment and with reference to the accompanying figures. All of the figures are purely schematic and not to scale. In the figures:

FIGS. 1a-1c show different states of a conventional vacuum-insulated line; and

FIG. 2 shows a vacuum-insulated line according to the invention;

Identical or similar elements are denoted by the same or similar reference designations in the figures.

EXEMPLARY EMBODIMENT

Figure 3:
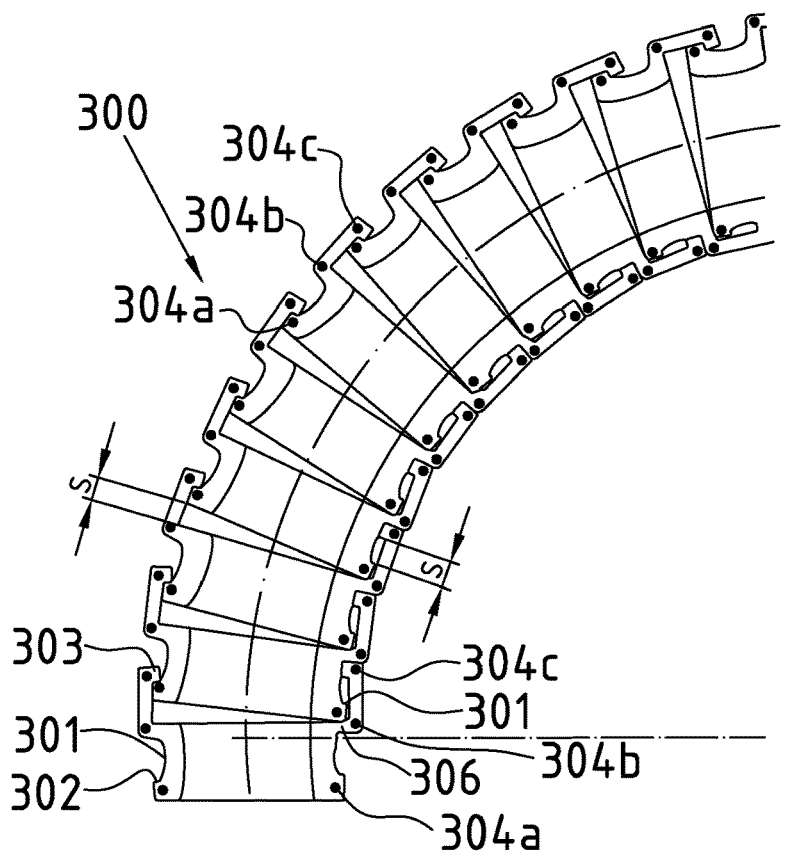
FIG. 3 shows a hose composed of interconnected plastics elements.

FIG. 1a shows, in cross section, a line 100 which has an inner corrugated hose 101 and an outer corrugated hose 102 which are separated from one another by an intermediate space 103. The inner corrugated hose 101 is encased with a superinsulator and is held centrally in the outer corrugated hose 102 by means of spacers. For the sake of clarity, the superinsulator and the spacers are not illustrated in FIG. 1a. The corrugated hoses 101, 102 are corrugated in a circumferential direction, and are thus flexible transversely with respect to their longitudinal extent and extensible in an axial direction.

At their respective ends, the corrugated hoses 101, 102 are welded to one another in vacuum-tight fashion, with the exception of a small flange 106 which is required for the evacuation of the intermediate space 103. The corrugated hoses 101, 102 are encased with, and fastened at the respective ends of the inner and outer corrugated hose 101, 102 to, a tension-resistant mesh 108, 109 composed of steel wire. The mesh is commonly welded together with a ring 401 (FIG. 4) onto the cylindrical end connector 402 (FIG. 4) of the corrugated hose. In other exemplary embodiments, said mesh may also be fastened for example with a clamping ring (not illustrated). In other exemplary embodiments, only the inner corrugated hose 101 or only the outer corrugated hose 102 is encased with a mesh 108 or 109. In this case, the mesh is designed such that only a single mesh can absorb the acting forces.

Depending on the usage situation, a connecting flange for connecting the line 100 to a connection point or to a further line is welded to the ends of the line 100. If appropriate, a coupling is attached to one or both ends of the line 100. This may for example be a QCDC coupling ("Quick Connect/Disconnect Coupler") or a Johnston coupling. The corrugated hoses 101, 102 are produced from rust-resistant steel. The connecting flanges or couplings are not illustrated in the figures.

FIG. 1a shows an assembled line in the case of which the intermediate space 103 has not yet been evacuated. In this state, the corrugated hoses 101, 102 and the mesh 108, 109 are in a relaxed state. The line 100 has, in this state, a length $L_1$.

To complete the production of the line, the intermediate space 103 is evacuated in order to produce a vacuum insulation. For this purpose, a device is mounted onto that end of the line 100 where the small flange 106 is situated. The device makes it possible firstly to connect a vacuum pump which evacuates the intermediate space 103. Secondly, the device makes it possible to screw a closure plug 107 (FIG. 1b) into the small flange 106, which closure plug closes off the intermediate space 103 in vacuum-tight fashion, specifically while the pump is still connected and in operation. The small flange 106 is then closed when the pressure in the intermediate space 103 has fallen to a predetermined value.

Already during the pumped evacuation of the intermediate space 103, the line 100 shortens in an axial direction, under the influence of the atmospheric pressure, to the length $L_2$, as shown in FIG. 1b. In a radial direction, the corrugated hoses 101, 102 are substantially stable under pressure, and therefore do not deform in a radial direction. Here, the meshes 108, 109 collapse, with no significant opposing force being generated.

FIG. 1c shows the line 100 during operation, said line transporting a medium under pressure in the interior space 111 of the inner corrugated hose 101. Here, the line 100 expands in an axial direction to a length $L_3$, which is limited by the maximum length expansion permitted by the meshes 108, 109.

If the pressure in the interior of the line 100 is reduced again, for example because a tank filling process has come to an end, then the line shortens again to the length $L_2$ (FIG. 1B). The length difference between the two states amounts to $\Delta L = L_3 - L_2$.

The flexibility of the line 100 is dependent inter alia on the spacing of the corrugations and on the corrugation depth of the corrugated hoses 101, 102. One specific exemplary embodiment of the line 100 has, in practice, the following values:

$L_1$=10 m; $L_2$=9.6 m and $L_3$=10.1 m. The evacuation of the intermediate space between the corrugated hoses 101, 102 thus leads to a shortening of the line by 4%. It is also to be noted that the increase in length is also dependent on the internal pressure in the line 100.

The diameter of the line 100 may for example amount to 0.1 m to 0.2 m.

For the transport of a medium between two fixed points, it is commonly the case in practice that multiple lines are connected to one another. If, for example, a number of N lines are connected to one another, then the entire line has an overall length of $N^*L_2$, and the overall length increases during operation to $N^*L_3$. The change in length between the two states is accordingly $N^*\Delta L$, and can give rise to the problems described in the introduction.

In an exemplary embodiment of a line 200 according to the invention as illustrated in FIG. 2, it is therefore the case that at least the mesh on the outer corrugated hose 102 is replaced by a wound hose 201, which is both tension-resistant and compression-resistant in an axial direction.

The enlarged detail in FIG. 2 shows a detail of the wound hose 201, which is produced from folded metal strips 202 fitted one inside the other. The lengths of the folds are dimensioned such that the metal strips 202 cannot be displaced relative to one another in an axial direction. In this way, the wound hose is tension-resistant and compression-resistant in an axial direction. The wound hose 201 is in any case compression-resistant in a radial direction. The inner corrugated hose 101 is encased with a mesh 108.

The wound hose 201 is produced from a metal, for example from high-grade steel, aluminium or an aluminium alloy. Use may basically also be made of material combinations of metal and plastic, as long as the axial tension resistance and compression resistance of the wound hose is ensured. The line 200 encased with the wound hose 201 therefore always maintains the same length $L_1$ in all situations described in conjunction with FIGS. 1a to 1c. In other words: no change in length of the line 200 occurs in different operating situations. Thus, all potential hazards associated with a change in length are also prevented from the outset.

The wound hose 201 on the outer corrugated hose 102 simultaneously forms a very good mechanical protection against external influences, because the wound hose 201 inter alia also has very good transverse compressive load-bearing capacity.

Owing to its form, the wound hose 201 also cannot bend to an excessive degree. It thus also simultaneously serves as a means for protecting the corrugated hoses 101, 102 against excessive bending.

In another exemplary embodiment, instead of the wound hose composed of metal, use may also be made of correspondingly designed elements composed of plastic, which, owing to their design, perform the function of the wound hose.

In other exemplary embodiments, the mesh 108 which encases the inner corrugated hose is also replaced by a wound hose.

In all exemplary embodiments, however, both the inner and the outer corrugated hose 101, 102 cannot be replaced by a wound hose, because a wound hose does not have the sealing action required to confine the vacuum in the intermediate space 103.

FIG. 3 shows a reinforcement hose 300 which is constructed from screwed-together plastics elements. The plastics elements form half-shells 301 which are screwed together. FIG. 3 is a plan view of the half-shells 301. The half-shells 301 are of substantially S-shaped form and have, at one end, an outwardly directed projection 302 and, at the opposite end, an inwardly directed projection 303. The half-shells are placed one inside the other such that the projections 302, 303 engage into one another. Each half-shell 301 is screwed to a second half-shell 301 at the fastening points 304a-304c, such that an annular body with a circular cross section is formed. The reinforcement hose 300 is formed in this way from a multiplicity of screwed-together half-shells 301. The reinforcement hose 300 is designed to be flexible transversely with respect to its longitudinal direction. For this purpose, a certain degree of play S is present between the projections 302, 303 and a central web 306, which degree of play is marked in FIG. 3 by arrows. The degree of play S is necessary in order to provide the reinforcement hose 300 with a certain degree of flexibility. However, the degree of play S also has the effect that the reinforcement hose 300 also becomes elongated in an axial direction. Said elongation is however limited by the degree of play S and can be set through corresponding dimensioning of the degree of play S.

If the ends of the half-shells 301 are of spherical form, similarly to the situation in a coolant hose or articulated hose, the basically undesired axial movement is greatly reduced.

The hose 300 also serves for protecting against excessive bending of the line 100.

Figure 4:
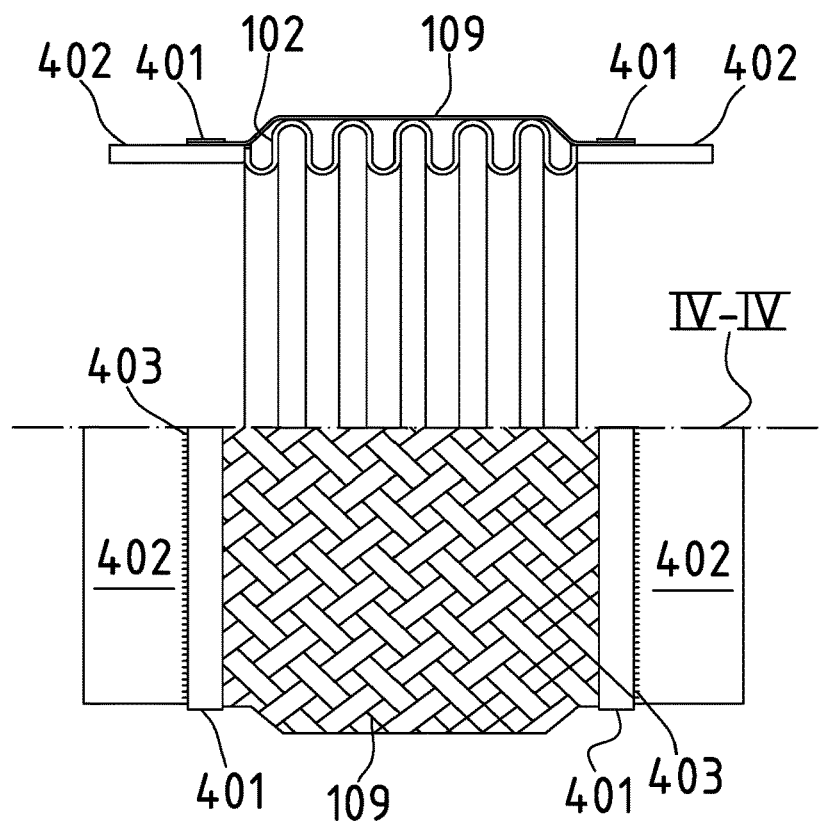
FIG. 4 shows the fastening of a mesh on a corrugated hose.

FIG. 4 illustrates, by way of example, the fastening of the mesh 109 on the outer corrugated hose 102. The fastening of the mesh 108 on the inner corrugated hose is realized in a similar manner.

The outer corrugated hose 102 is illustrated in a cross section in the upper part of FIG. 4 above the dash-dotted line IV-IV. A plan view of the mesh 109 and the corrugated hose 102 is shown in the lower part of FIG. 4 below the dash-dotted line IV-IV. The mesh 109 is welded together with in each case one ring 401 onto a cylindrical end connector 402 of the corrugated hose 102.

LIST OF REFERENCE DESIGNATIONS

100 Line
101 Inner corrugated hose
102 Outer corrugated hose
103 Intermediate space
106 Small flange
107 Closure plug
108 Mesh
109 Mesh
200 Line
201 Wound hose
202 Metal strip
300 Hose
301 Half-shells
302 Projection
303 Projection
304a—Fastening points
304c
306 Central web
401 Ring
402 End connector

The invention claimed is:

1. A vacuum-insulated line comprising:
an inner and an outer corrugated hose which are separated from one another by an evacuated intermediate space, wherein the inner corrugated hose is encased along its entire longitudinal extension from one end to the other end of the vacuum insulated line with a reinforcement hose which is arranged in the intermediate space between the inner and outer corrugated hose of the vacuum insulated line and which is tension-resistant and compression-resistant in an axial direction, wherein said reinforcement hose includes plastic elements forming half-shells which are screwed together and which are movable relative to one another forming said reinforcement hose, and wherein the reinforcement hose prevents longitudinal expansion and contraction during operation of the vacuum insulated line.

2. The line according to claim 1, wherein the corrugated hoses are designed to be corrugated in a circumferential direction and flexible.

3. The line according to claim 1, wherein the reinforcement hose is designed to be flexible.

4. The line according to claim 1, wherein the inner and the outer corrugated hose are welded to one another in vacuum-tight fashion at their ends.

5. The line according to claim 1, wherein either the inner or the outer corrugated hose is encased with the reinforcement hose, whereas the other corrugated hose is encased with a mesh.

6. A loading device for cryogenic fluids having the line according to claim 1.

* * * * *